(12) United States Patent
Weickert

(10) Patent No.: US 6,518,372 B1
(45) Date of Patent: Feb. 11, 2003

(54) METHOD AND APPARATUS FOR GAS PHASE POLYMERIZATION OF α-OLEFINS

(75) Inventor: Günter Weickert, Ahaus (DE)

(73) Assignee: Basell Polyolefine GmbH (DE)

( * ) Notice: Subject to any disclaimer, the term of this patent is extended or adjusted under 35 U.S.C. 154(b) by 0 days.

(21) Appl. No.: 09/913,743

(22) PCT Filed: Feb. 16, 2000

(86) PCT No.: PCT/EP00/01253

§ 371 (c)(1),
(2), (4) Date: Jan. 24, 2002

(87) PCT Pub. No.: WO00/49055

PCT Pub. Date: Aug. 24, 2000

(30) Foreign Application Priority Data

Feb. 19, 1999 (DE) .......................... 199 07 021

(51) Int. Cl.⁷ .................................. C08F 2/34
(52) U.S. Cl. .................. 526/64; 526/68; 526/348.2; 526/348.5; 526/348.6
(58) Field of Search .............. 526/64, 901, 68, 526/348.2, 348.5, 348.6

(56) References Cited

U.S. PATENT DOCUMENTS

| | | | |
|---|---|---|---|
| 4,424,341 A | * 1/1984 | Hanson et al. | 528/501 |
| 4,740,551 A | 4/1988 | Foster | 525/52 |
| 5,041,473 A | 8/1991 | Gau et al. | 523/330 |
| 5,208,109 A | 5/1993 | Bailly et al. | 428/402 |
| 5,378,434 A | 1/1995 | Staffin et al. | 523/330 |
| 5,504,166 A | 4/1996 | Buchelli et al. | 526/60 |

FOREIGN PATENT DOCUMENTS

| | | |
|---|---|---|
| DE | 32 17973 | 11/1983 |
| DE | 196 34 450 | 3/1998 |
| EP | 0096221 | 12/1983 |
| EP | 0574821 | 12/1993 |
| FR | 550233 | 3/1923 |
| WO | WO 97/04015 | 2/1997 |

* cited by examiner

*Primary Examiner*—David W. Wu
*Assistant Examiner*—William Cheung
(74) *Attorney, Agent, or Firm*—Connolly Bove Lodge & Hutz LLP

(57) ABSTRACT

In a process for the gas-phase polymerization of α-olefins at from 20 to 130° C. and pressures of from 1 to 100 bar, the polymerization is carried out in a tubular reactor having a length:diameter ratio of >100 and the growing polymer particles pass through the tubular reactor in its longitudinal direction without a significant part of the polymer particle stream being circulated.

13 Claims, 1 Drawing Sheet

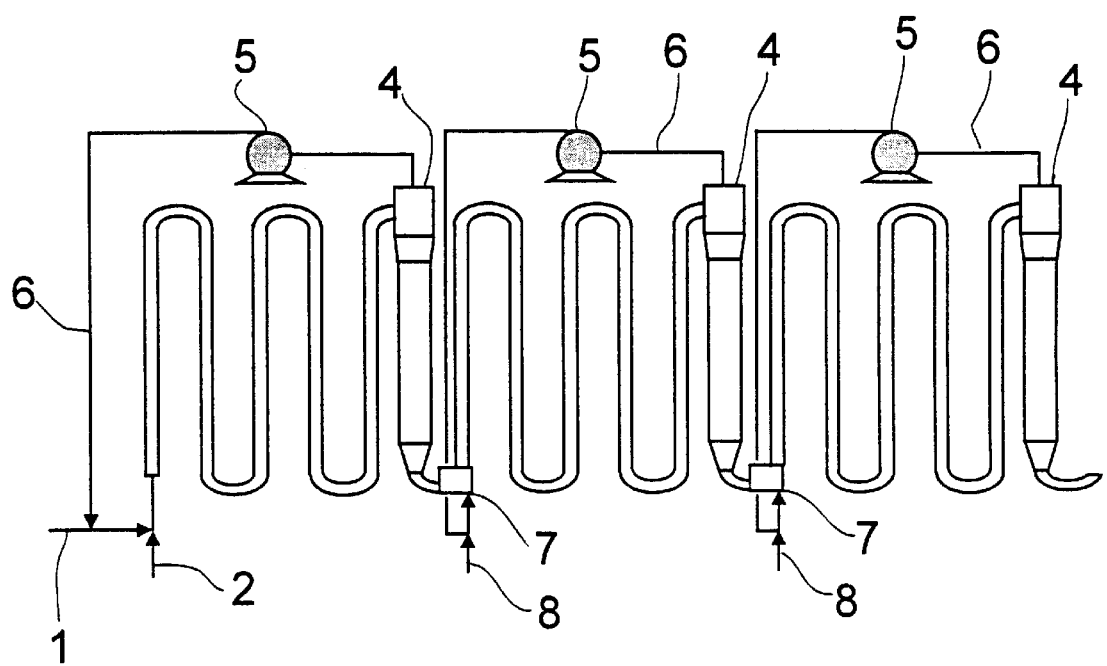

METHOD AND APPARATUS FOR GAS PHASE POLYMERIZATION OF α-OLEFINS

The present invention relates to a process for the gas-phase polymerization of α-olefins at from 20 to 130° C. and pressures of from 1 to 100 bar. The invention also relates to a tubular reactor for the gas-phase polymerization of α-olefins having a length:diameter ratio of >100.

Gas-phase polymerization processes have been found to be particularly economical processes for the polymerization of α-olefins, in particular for the homopolymerization and copolymerization of ethylene and propylene and for the copolymerization of these olefins with higher α-olefins. Particularly, for the preparation of homopolymers and copolymers of ethylene, these gas-phase polymerizations are usually carried out in fluidized-bed reactors. Examples of such gas-phase fluidized-bed processes are described in U.S. Pat. No. 5,208,109 and in U.S. Pat. No. 5,041,473.

In the known gas-phase fluidized-bed processes, the reaction gas, which may, if desired, comprise regulators and inert gases in addition to the monomers, is circulated and utilized for mixing the fluidized bed which comprises small polymer particles. During the course of the polymerization process, the polymer particles grow and are discharged from the reactor either continuously or intermittently. As a result of the virtually perfect mixing of the fluidized bed and the discharge of only a small part of the reactor contents, the polymer particles in the reactor have very different residence times. Thus, some of the particles discharged have been subjected to the polymerization process for only a very short time and consequently have small diameters. On the other hand, there are particles which have spent a long time in the polymerization reactor before being discharged. The result is that the polymer particles have a very broad residence time distribution.

To achieve a defined structural inhomogeneity of the polymer, e.g. in the production of bimodal polyethylene or high impact polypropylene, the polymerization can be carried out either in a plurality of apparatuses or in different reaction zones of the same apparatus. In either case, the polymer particles have to be subjected to various reaction conditions. These different reaction conditions can comprise, for example, different temperature, different pressure, different monomer concentrations or different concentrations of the regulator, for example hydrogen, or combinations of these. However, if the residence time distribution of the polymer particles in the different reaction zones or in the different reactors is broad, as is the case in the abovementioned gas-phase fluidized-bed polymerization, the polymer properties resulting from the different process parameters become blurred and the polymer product has a broad, random distribution of different polymer particles.

To reduce the influence of a broad residence time distribution and the associated width of the distribution of the particle properties, methods involving an increase in the number of reactors connected in series have been pursued. Thus, U.S. Pat. No. 5,504,166 describes a horizontal reactor whose volume is divided into chambers so that the polymer powder can only flow forward from chamber to chamber. The chambers themselves can be regarded as virtually ideally mixed. The polymer powder in the individual chambers is mixed by mechanical stirrers.

A similar gas-phase polymerization process is described in U.S. Pat. No. 5,378,434. In this process, the individual reaction chambers contain fluidized beds of polymer and different gas compositions can be set in the various chambers so that the preparation of bimodal or multimodal polymers is possible. However, as a result of the virtually ideal mixing of the polymer particles in the individual reactor chambers, these processes too have relatively large product inhomogeneities owing to the broad residence time distribution of the polymer particles in the individual reactors.

The differences in the structure of the polymer from particle to particle and thus the inhomogeneity of the polymer product increase as the residence time distribution broadens. From the fundamentals of chemical engineering, it is known that a single well-mixed reactor, e.g. a stirred tank or a fluidized-bed reactor, has the broadest residence time distribution and a tube reactor with plug flow has the narrowest residence time distribution. In the theoretical, ideal case, the plug-flow tube reactor corresponds to a reactor cascade having an infinite number of mixing cells.

WO-97/04015 describes a gas-phase polymerization process which is carried out in a flow tube. However, this flow tube is arranged as a loop, so that the polymer particles are circulated during the polymerization process. Since the particle circulation times in this loop reactor are very short in order to achieve intensive mixing of the particles and these particle circulation times are far below the mean residence time, this process too has a particle residence time distribution which is not significantly different from a customary fluidized-bed reactor.

It is an object of the present invention to provide a gas-phase polymerization process for the polymerization of α-olefins which has a narrow residence time distribution of the polymer particles and is therefore suitable for preparing, in particular, bimodal and multimodal polymers of excellent homogeneity.

We have found that this object is achieved by a process for the gas-phase polymerization of α-olefins at from 20 to 130° C. and pressures of from 1 to 100 bar, wherein the polymerization is carried out in a tubular reactor having a length:diameter ratio of >100 and the growing polymer particles pass through the tubular reactor in its longitudinal direction without a significant part of the polymer particle stream being circulated. Furthermore, we have found a tubular reactor for the gas-phase polymerization of α-olefins having a length:diameter ratio of >100, comprising at least one facility for feeding in reaction gas, at least one facility for feeding in catalyst, a polymer discharge system and at least one facility for separating the reaction gas from the polymer particles and recirculating the reaction gas to the inlet region of the reactor or for feeding in the reaction gas at a point upstream of the separation position.

The temperature and pressure conditions in the process of the present invention generally correspond to those in known gas-phase fluidized-bed processes, although the process offers the opportunity of varying these temperatures within the customary ranges in various parts of the reactor. The process can be carried out at from 20 to 130° C., in particular from 70 to 120° C. and particularly advantageously from 80 to 110° C. The reaction pressures can also be within the ranges which are customary for gas-phase fluidized-bed polymerizations. Thus, the process can advantageously be carried out at pressures of from 5 to 50 bar, particularly preferably at pressures of from 15 to 30 bar.

An important feature of the reactor of the present invention is its length:diameter ratio. The greater this length:diameter ratio, the narrower is, in general, the residence time distribution of the polymer particles. In the case of extremely long and thin reactors, either the pressure drop in the direction of the longitudinal co-ordinate is uneconomically high or the throughput achieved is too small, so that the reactor geometry is limited by these considerations. Good flow of the polymer particles with approximately plug flow and also narrow residence time distributions of the polymer particles are obtained in polymerization reactors having a length:diameter ratio of >100; the tubular reactors preferably have a length:diameter ratio of >300, particularly preferably from 300 to 1000.

A preferred geometry of a reactor according to the present invention for the industrial, commercial scale has a tube diameter in the range from 10 to 100 cm and a length of from 50 to 2000 m.

In contrast to the gas-phase polymerization process described in WO-97/04015, which is carried out in a loop-type tube reactor, the polymer particles in the polymerization process of the present invention pass through the tubular reactor in its longitudinal direction without a significant part of the polymer particle stream being circulated. Small parts of the polymer particle stream can, for example in reactors according to the invention in which the gas composition is to be altered during the course of the polymerization and part of the reaction gas is separated off and recirculated to the beginning or an upstream position, be entrained in this circulating reaction gas and can be circulated in this way. It is also possible for more intensive backmixing of the powder, e.g. for heat management reasons, to achieve better mixing-in of components fed in, to make possible a more uniform monomer sorption in the polymer powder or to separate off undesired polymer fractions, to occur in parts of the reactor whose total length is nevertheless small compared to the reactor length without the width of the overall residence time distribution being adversely affected to a significant extent as a result. However, the major part of the particles passes through the tube reactor of the present invention only in its longitudinal direction.

The small proportion of circulated polymer powder can also be described by the circulation ratio (CR):

$$CR = \frac{\Sigma \text{ Polymer mass flows in recirculated streams}}{\text{Polymer mass flow at the reactor outlet}}$$

According to the present invention, the CR is generally <0.1, preferably <0.05.

The process of the present invention is preferably carried out in such a way that the solids mass ratio of the mass flow at the reactor inlet (catalyst particles or prepolymer) to that at the reactor outlet (polymer) is <1:100, particularly preferably <1:1000. Furthermore, the ratio of the mass of the polymer produced to the mass of the catalyst metal component is generally >50,000, preferably >100,000, particularly preferably >500,000.

The process of the present invention is preferably carried out in a tubular reactor which is arranged essentially vertically. Such a reactor has alternately ascending and descending tube sections which are each connected to one another by bends having a relatively small radius. The diameter of the tube can vary. Thus, it can be advantageous, for example, for the diameter of the ascending tube sections to be at least in part smaller than that of the descending sections. In the case of such reactors, the abovementioned length:diameter ratio is then based on the mean diameter of the reactor. The vertical arrangement of the reactor tubes achieves particularly good contact between gas and polymer particles and enables the undesirable settling of the powder as a result of gravity with catastrophic consequences (wall deposits, local hot spot) to be avoided significantly better.

In the vertical tube sections with upward flow, the flow velocity is generally a multiple of the minimum fluidization velocity, while in the reactor sections with downward particle flow, the gas velocity can be significantly lower. In the case of separation of gas and solid in the upper part of the reactor, the gas can here even move in countercurrent to the particle phase, i.e. in an upward direction in a gas circuit separate from the main flow. The reactor sections with downward particle flow can thus be operated either in a slightly fluidized state or as trickle reactors with relatively high proportions of solid phase.

In a preferred embodiment of the process of the present invention, the effective axial velocity of the polymer powder in reactor sections having an upward flow direction is less than 80% of the velocity of the reaction gas in these reactor sections. The effective axial velocity of the polymer powder in these reactor sections having an upward flow direction is preferably from 5 to 200 cm/sec, particularly preferably from 10 to 100 cm/sec. In the descending tube sections, this velocity is, in contrast, generally from 200 cm/s (in the case of gas and particles flowing in cocurrent) to 2 cm/s (in the case of countercurrent flow).

The effective axial velocity of the polymer powder in the tube sections with downward flow is particularly preferably from about 1 to 5 cm/s.

However, the vertical tube sections with upward flow can also be operated in the "slugging" regime. Here, the diameter of the gas bubbles, which grow along the length of the reactor, reaches the diameter of the tube under conditions well-known to those skilled in the art, resulting in formation of polymer powder slugs of various lengths which are transported upward at a relatively uniform velocity by the gas. Here, the slugs are arranged alternately along the length of the reactor, so that the solids-rich slugs alternate with low-solids gas pockets. During transport of the slugs, powder trickles from the end of one slug through the intervening gas pocket onto the top of the slug behind it, while at the same time gas flows at a low velocity in the flow direction through each slug. The time between formation and disintegration of a slug is in the order of a few seconds, so that even in the case of a relatively highly exothermic polymerization no really significant temperature gradients can be built up in the slug.

Particular advantages of this mode of operation are:
a) the self-cleaning of the reactor wall as a result of the shearing action of the powder in the vicinity of the reactor wall
b) the ability to vary and control the residence time of the powder within wide limits
c) the suppression of blowing-out of small particles (catalyst!)
d) the limited backmixing of the powder If the solids-rich tube sections with upward flow operated in the slugging regime are combined with tube sections with downward cocurrent flow of gas and powder, one obtains a further, particularly economically favorable, novel version of the reactor which is simple to construct and operate and has relatively short reactor lengths.

Since the polymerization of α-olefins is an exothermic process, it is necessary for the heat of reaction to be able to be removed effectively. Heat removal is preferably carried out via the reactor wall. It is advantageous, for example, for the reaction tube to be provided with a cooling jacket in which a cooling liquid, e.g. water, can circulate. To keep the reaction temperature constant or, if desired, to be able to set different, defined temperatures in various reactor sections, it is also advantageous to segment the cooling system.

Various ethylenically unsaturated monomers can be polymerized using the polymerization process of the present invention. Examples which may be mentioned are ethylene, propylene, 1-butene, iso-butene, 1-pentene, 1-hexene, 1-heptene, 1-octene and also higher α-olefins; further suitable monomers are, for example, dienes such as butadiene and cyclopentadiene and cycloolefins such as cyclopentene and cyclohexene. Depending on the catalyst system used, it is also possible to polymerize polar monomers such as acrylic esters or vinyl acetate or to use them as comonomers. The ethylenically unsaturated monomers can be polymerized alone or in mixtures. In a preferred embodiment of the process of the present invention, the α-olefin used is ethylene, propylene, 1-butene, 1-pentene, 1-hexene, 1-octene or a mixture of these monomers. Particular preference is given to the copolymerization of ethylene with 1-butene or 1-hexene and the homopolymerization of ethylene and propylene.

The advantages of the process of the present invention, in particular the opportunity of preparing very homogeneous polymer products, becomes particularly apparent when the reaction conditions along the tubular reactor are varied. Thus, as mentioned at the outset, it is advantageous for different temperatures to be set along the reactor tube. The product properties can be varied in an even more pronounced manner and, in particular, advantageous bimodal or multimodal polymer products can be obtained by setting different gas compositions in various regions of the tubular reactor. The simplest way of altering the gas composition along the tube reactor is to add fresh reaction gas constituents along the reactor tube by means of appropriate feed facilities. Thus, for example, the reaction gas can be enriched with fresh monomers, or molecular weight regulators such as hydrogen can be additionally fed in. Particularly when fresh monomer is added at various positions along the reactor tube, it is advantageous to utilize this monomer for removing the heat of the reaction too. This can be achieved, for example, by adding the monomer in cool form, possibly even at a temperature below the dew point of the monomer mixture fed in.

Even greater opportunities for variations in the setting of the polymer properties can be achieved by at least one facility for gas/solid separation being located in the reactor in the region between the inlet and the outlet of the reactor and the solids being conveyed further through the reactor in the flow direction and the reaction gas which has been separated off being conveyed back and refed into the reactor at an upstream point. Such a gas/solid separation can be achieved most simply by means of a cyclone. This cyclone is preferably located at the upper end of a descending tube section, so that the polymer powder can trickle into this tube section under the action of gravity. The reaction gas which has been separated off can then be conveyed back and fed into the reactor again either at the inlet of the reactor or at least at a position upstream of this cyclone. In this procedure, it may be advantageous to cool the reaction gas in order to remove further reaction heat from the process. In general, it is also useful to enrich the circulated reaction gas with the monomers and other reaction components consumed in the process in order to be able to set constant gas conditions in the corresponding reactor section.

In an advantageous embodiment of the process of the present invention, gases fed in along the reactor are introduced at the lower end of the reactor sections having an upward flow direction and below the point at which the particle stream enters these reactor sections. This can be achieved most simply by a gas distributor plate of the type customarily used in gas-phase fluidized-bed processes being installed at the lower end of the reactor sections having an upward flow direction. The polymer particle stream thus flows through a bottom bend into the ascending reactor tube section, flows past this gas distributor plate and is swirled upward by the freshly fed-in reaction gas.

In another advantageous embodiment of the process of the invention, the reactor used has at least one gas/solid separation facility of this type, preferably even two or more of these facilities.

The reaction conditions which can be set in the different reactor regions can be varied widely. Thus, depending on the desired polymer, it is possible to set in succession reaction conditions as are known to those skilled in the art from other gas-phase polymerization processes, particularly from single-stage processes. Thus, the desired density can, in particular, be set by means of the proportion of comonomer, and the molecular weight of the polymer can generally be influenced effectively by the concentration of, for example, hydrogen.

The catalysts used for the polymerization naturally have a significant influence on the polymer properties. Suitable catalysts are, in particular, supported catalysts as are also customarily used in other gas-phase polymerization processes.

Suitable support materials for these catalysts are, for example, inorganic oxides such as silica, aluminium oxide or magnesium oxide, but more complex support materials such as aluminosilicates or zeolites can also be used as supports.

Organic support materials, for example ones based on polystyrene, are also possible for this purpose.

Catalysts which can be used are, for example, all chromium, Ziegler or metallocene catalysts known to those skilled in the art. The cocatalysts to be used in conjunction with these are also known to those skilled in the art; these too do not need to meet any particular requirements for the purposes of the process of the present invention. Furthermore, it can be advantageous to first subject the supported catalyst particles to a prepolymerization. This prepolymerization, in which only small amounts of monomer are polymerized on the catalyst particles, can be carried out outside the reactor, e.g. in a known manner by solution or suspension polymerization, but it is also possible to carry out such a prepolymerization in the liquid or gaseous phase in the first region at the beginning of the tube reactor. However, in such a prepolymerization zone, preferably only small amounts of monomer which correspond to not more than 5%, preferably less than 2%, of the desired polymer product should be reacted. For any prepolymerization and also generally for the first polymerization zone in the reactor of the present invention, preference is given to using only one monomer, for example ethylene or propylene. Comonomer-containing reaction gas streams are preferably fed in only downstream of these first polymerization sections of the reactor.

In a preferred embodiment, the initial section of the reactor of the present invention, i.e. the first upward-directed tube section, is configured as follows: The lower tube piece of this upward-directed tube section is configured so that it has a significantly larger diameter than the upper part of this tube section. The catalyst is fed into this lower tube piece. The removal of the heat of reaction occurs in this tube piece primarily by introduction of liquid monomer, preferably liquid propylene and/or liquid inert gas, for instance propane. In an industrial embodiment, the lower tube piece should have a diameter of at least one meter, preferably at least 2 m. This achieves, inter alia, effective convective cooling. The gas velocity in the lower tube piece is advantageously from 0.2 to 0.6 ms$^{-1}$, and the bed density is advantageously from 150 to 400 kg/m$^3$. The upper part of the first upward-directed tube section has a smaller diameter than the lower section, which leads to a higher flow velocity. This reactor part can also be configured as a multitube reactor, by means of which better heat removal via the reactor jacket and very limited backmixing can be achieved.

The tubular reactor of the present invention comprises at least one facility for feeding in reaction gas, at least one facility for feeding in catalyst, a polymer discharge system and at least one facility for separating the reaction gas from the polymer particles and recirculating the reaction gas to the inlet region of the reactor. If the reactor has only one facility for separating the reaction gas from the polymer particles, this is installed at the end of the reactor and coupled to the polymer discharge system. The separation of the polymer from the gas stream is preferably carried out by means of a cyclone. The particle stream is then preferably introduced into a descending tube reactor section which is slightly fluidized by means of a gas stream of low monomer concentration, while the product is preferably taken off by intermittent or continuous venting at the lower end of this tube section, keeping the fill level in this tube section constant.

BRIEF DESCRIPTION OF THE DRAWINGS

FIG. 1 briefly shows the reactor of the present invention comprising three facilities for separating the reaction gas from the polymer particles.

An advantageous embodiment of the reactor of the present invention is shown in FIG. 1. The reaction gas is fed in via line (1) and the catalyst, if desired in combination with a suitable cocatalyst, can be introduced into the reactor via line (2). The polymerization mixture then first passes through a tube system of ascending and descending vertical tube sections which are connected to one another by means of bends. In the cyclone (4), a first separation of the polymer particles from the reaction gas occurs. The reaction gas which has been separated off is conveyed via a compressor (5) through a gas circulation line (6) which may, if desired, be provided with a cooling facility and is fed back into the reactor. The gas composition can be set by means of the metering of the reaction gas stream 1. The polymer powder separated from the reaction gas in the cyclone (4) is first conveyed through a descending tube section and then, via the bend, again into an ascending tube section at the lower end of which there is installed a gas distributor plate (7) through which a second circulated gas stream (6), if desired enriched by fresh monomer or additional comonomer, is fed into the tube reactor and is utilized for fluidization and for the further transport of the polymer particles. The reactor shown schematically in FIG. 1 comprises three facilities for separating the reaction gas from the polymer particles; the third of these facilities is at the same time part of the polymer discharge system.

EXAMPLE

Preparation of Bimodal Ethylene Copolymers

The polymerization was carried out in a reactor comprising a first tube reactor section A (length=80 m, internal diameter=5 cm), a gas/solid separation (cyclone) with integrated (downstream) trickle reactor B (length=5 m, internal diameter=10 cm) and a second tube reactor section C (length=120 m, internal diameter=5 cm), to which a further gas/solid separation with cellular wheel discharge and subsequent depressurization of the product were connected. Reactor section B was maintained in a fluidized state by means of a further gas circuit flowing in countercurrent to the polymer flow direction, which at the same time enables the hydrogen to be separated off in a readily controllable manner. At the inlet of the reactor section A, 40 gh$^{-1}$ of a prepolymerized catalyst (Ziegler-Natta catalyst supported on silica gel, prepolymerized with propylene in suspension) were injected. The mean activity of this catalyst in reactor section A was 5.98 kg of PE/(g of prepolymer x h), in reactor section B was 0.51 kg of PE/(g of prepolymer x h) and in reactor section C was 8.05 kg of PE/(g of prepolymer x h). The mean particle diameter of the prepolymer was about 150 $\mu$m. The molar ethylene:hydrogen ratio was set to 4.8 in reactor section A and to 100 in reactor sections B and C by feeding in ethylene and hydrogen at intermediate points. In the same way, the hexene:ethylene ratio in reactor section A was maintained at 0 and that in reactor sections B and C was maintained at 0.1. The residence times of the solid phase (polymer) were set to 9 minutes, 0.5 minutes and 6 minutes in the three reactor sections by regulation of the gas velocity. At a mean temperature of 70° C., 90° C. and 85° C., 57 kgh$^{-1}$ of bimodal PE having a mean particle size of 1580 $\mu$m were produced.

I claim:

1. A process for a gas-phase polymerization of α-olefins into growing polymer particles which comprise polymerizing α-olefins at from 20 to 130° C. and pressures of from 1 to 100 bar, wherein the polymerization is carried out in a tubular reactor having a length:diameter ratio of >100 and the growing polymer particles pass through the tubular reactor in its longitudinal direction without a significant part of the polymer particle, stream being circulated.

2. A process as claimed in claim 1, wherein the tubular reactor has a length:diameter ratio of >300.

3. A process as claimed in claim 1, wherein the tubular reactor is arranged essentially vertically.

4. A process as claimed in claim 1, wherein the effective axial velocity of the polymer powder in reactor sections having an upward flow direction is less than 80% of the velocity of the reaction gas in these reactor sections.

5. A process as claimed in claim 1, wherein the effective axial velocity of the polymer powder in reactor sections having an upward flow direction is from 5 to 200 cm/s.

6. A process as claimed in claim 1, wherein the polymerization temperature is from 70 to 120° C.

7. A process as claimed in claim 1, wherein the α-olefin is ethylene, propylene, 1-butene, 1-pentene, 1-hexene, 1-octene or a mixture thereof.

8. A process as claimed in claim 1, wherein the tubular reactor comprises at least on facility for gas/solid separation.

9. A process as claimed in claim 8, wherein at least one facility for gas/solid separation is located in the region between the inlet and the outlet of the reactor and the solids are conveyed further through the reactor in the flow direction and the reaction gas which has been separated off is conveyed back and is re-fed into the reactor at an upstream point.

10. A process as claimed in claim 1, wherein gases fed in along the reactor are introduced at the lower end of the reactor sections having an upward flow direction and below the point at which the particle stream enters these reactor sections.

11. A process as claimed in claim 1, wherein different gas compositions are set in various regions of the tubular reactor.

12. A process as claimed in claim 1, wherein fresh reaction gas constituents are added along the reactor tube by means of at least one feed facility.

13. A process as claimed in claim 1, wherein different temperatures are set along the reactor tube.

* * * * *